Dec. 31, 1929.                F. L. ORR                 1,741,709
                              BEAN CUTTER
                        Filed Dec. 19, 1927       2 Sheets-Sheet 1
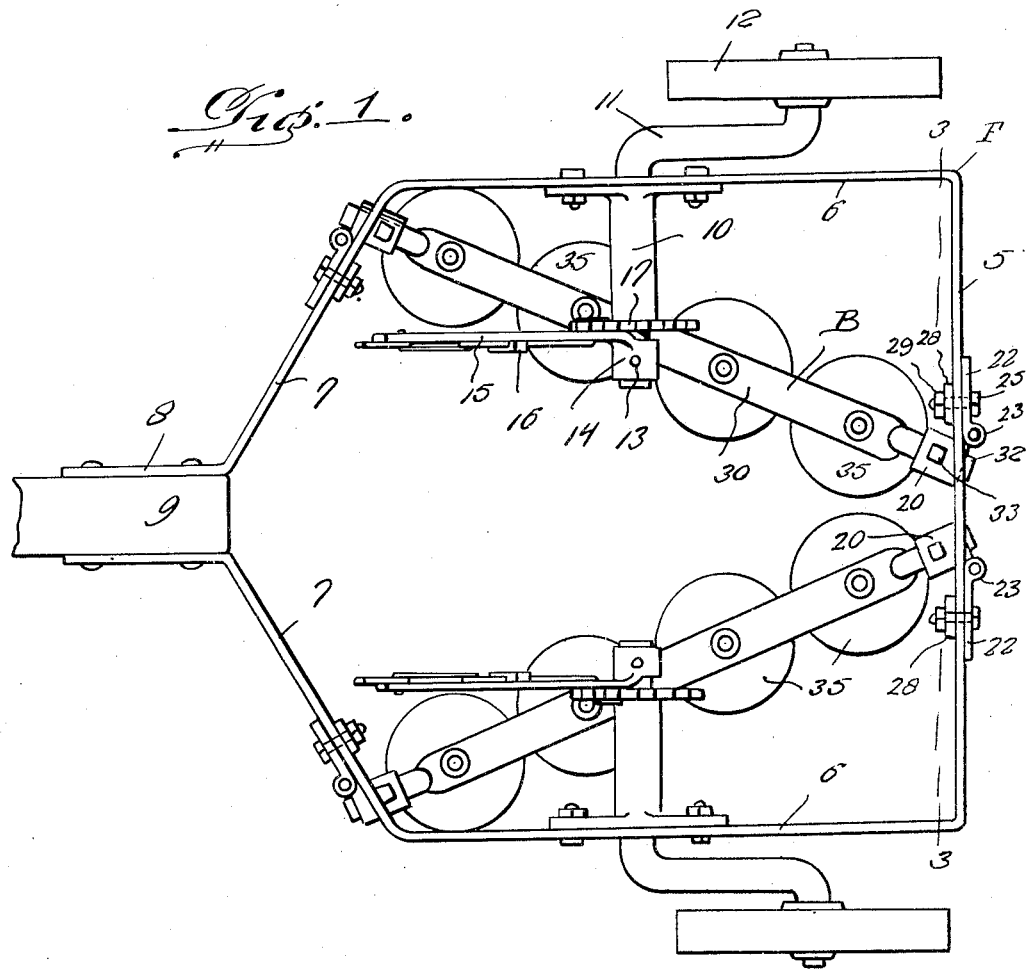
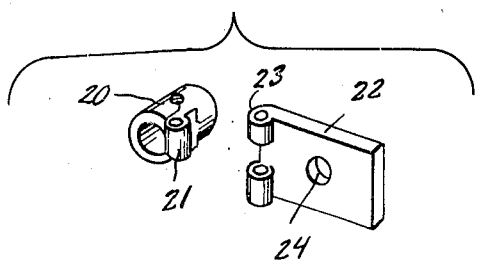
Inventor
F. L. Orr,
By Clarence A. O'Brien
Attorney

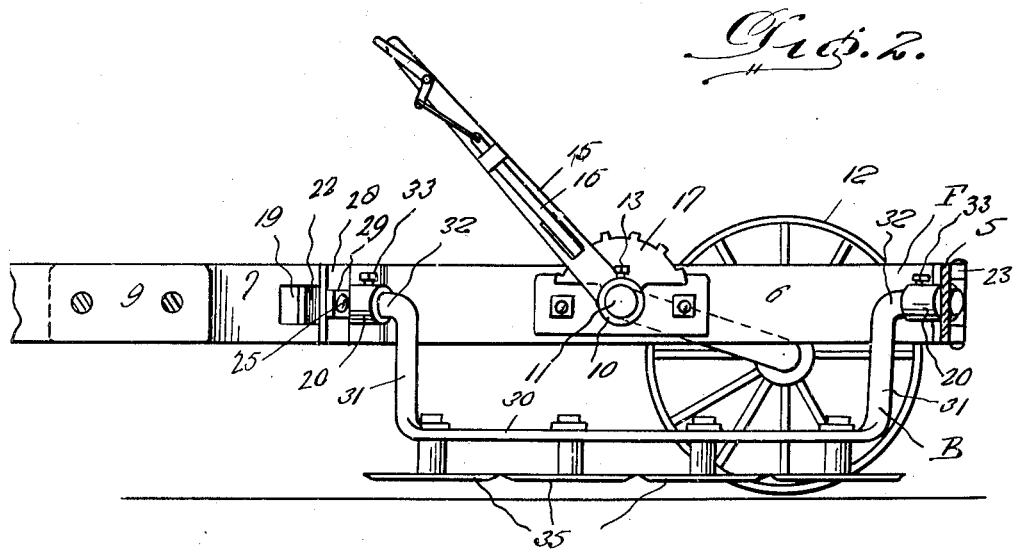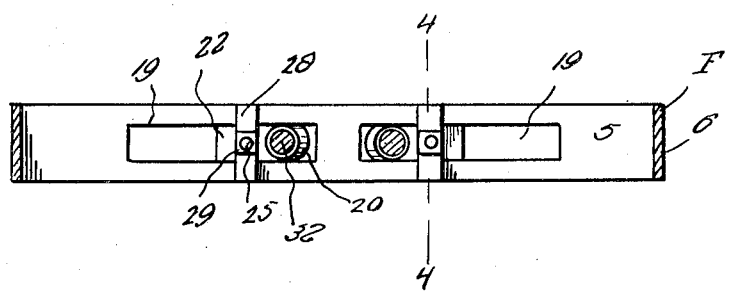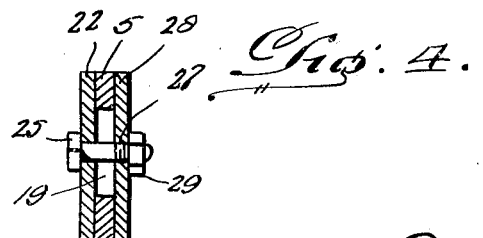

Patented Dec. 31, 1929

1,741,709

UNITED STATES PATENT OFFICE

FRANCIS L. ORR, OF SACRAMENTO, CALIFORNIA

BEAN CUTTER

Application filed December 19, 1927. Serial No. 241,230.

The present invention relates to a bean cutter and has for its prime object to provide a wheeled structure which may be pulled along to cut a plurality of rows of beans and is adjustable so that the depth of the cut may be regulated.

Another very important object of the invention resides in the provision of a bean cutting apparatus of this nature including a frame with two series of cutters obliquely disposed in relation to each other and means whereby the angle between the series may be adjusted.

A still further important object of the invention resides in the provision of a bean cutting apparatus of this nature which is simple in its construction, easy to manipulate, thoroughly efficient and reliable in use, and has its parts arranged in a convenient manner for adjustment.

With the above and numerous other objects in view as will appear as the description proceeds, the invention resides in certain novel features of construction, and in the combination and arrangements of parts as will be hereinafter more fully described and claimed.

In the drawing:

Figure 1 is a top plan view of the apparatus embodying the features of my invention, Figure 2 is a longitudinal vertical section therethrough, Figure 3 is a transverse vertical section taken substantially on the line 3—3 of Figure 1, Figure 4 is an enlarged detail transverse vertical section taken substantially on the line 4—4 of Figure 3, and Figure 5 is a perspective view showing the bearing bracket used in the apparatus.

Referring to the drawing in detail it will be seen that the letter F denotes a frame comprising a rear cross bar 5, a pair of side bars 6 disposed perpendicularly to the bar 5 extending forwardly therefrom in spaced parallelism and merging into inwardly and forwardly directed extensions 7 which in turn merge into forwardly and parallel spaced extensions 8 between which is fixedly mounted a tongue or the like 9.

Bearings 10 project inwardly from the side bars 6 and have journaled therein crank like axles 11 on the outer extremities of which are journaled wheels 12 and on the inner extremities of which are adjustably engaged by set screws 13, sleeve terminals 14 of the levers 15. The levers 15 have detent structures 16 cooperable with notched segments 17 on the bearings 10. Obviously by the manipulation of the levers the frame may be raised or lowered.

The frame F in the bar 5 and extensions 7 is provided with slots 19 through which extend bearings or sleeves 20. Each bearing 20 is provided with a board lug 21 while a corresponding plate 22 is provided with a pair of spaced board lugs 23 to receive the lug 21 so that a pin may be passed through the lugs to hingedly engage the bearing 20 on the plate 22. The plate 22 has openings 24 receiving bolts 25 which project through the slots 19 and through openings 27 in plates 28 and nuts 29 are engaged on the bolts to hold the plates 22 and 28 tightly against the frame. In this way it will be seen that the bearings 20 may be held in different adjusted positions. U-shaped bracket members B are formed with straight elongated bight portions 30 and upwardly extending legs 31 terminating in outwardly directed journal extensions 32 disposed in bearings 20. Set screws 33 are threaded through the bearings 20 and engage on the journal extensions 32. These brackets B are disposed obliquely in respect to each other diverging rearwardly from each other as is clearly illustrated in Figure 1. The angle between the brackets B may be varied as desired by the adjustment afforded by the manner in which the bearings 20 are mounted in the slots 19 as explained above.

A plurality of disk cutters 35 are rotatably mounted on the bight 30 therebelow.

From the above detailed description it will be seen that the cutting depth of the disk 35 may be controlled by raising and lowering the frame F as heretobefore stated. It is preferable to operate the disk 35 a little below the surface of the ground and as the apparatus is pulled along several rows of beans may be cut.

It is thought that the construction, utility, and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

An apparatus of the class described comprising a frame provided with two pairs of slots, sleeves extending through said slots, two pair of clamp plates on the frame, bolts extending through the slots for adjustably holding the clamp plates on the frame, means for hingedly engaging one plate of each pair with the respective sleeve, a pair of U-shaped brackets having outwardly directed terminal extensions in the sleeves, set screws in the sleeves to prevent rocking of the terminal extensions, and a plurality of cutting disks rotatably mounted on the bight portion of the bracket.

In testimony whereof I affix my signature.

FRANCIS L. ORR.